(12) United States Patent
Zeng

(10) Patent No.: US 11,256,829 B2
(45) Date of Patent: Feb. 22, 2022

(54) DATA VERIFICATION

(71) Applicant: ALIPAY (HANGZHOU) INFORMATION TECHNOLOGY CO., LTD., Zhejiang (CN)

(72) Inventor: Shiqin Zeng, Hangzhou (CN)

(73) Assignee: Alipay (Hangzhou) Information Technology Co., Ltd., Zhejiang (CN)

(*) Notice: Subject to any disclaimer, the term of this patent is extended or adjusted under 35 U.S.C. 154(b) by 0 days.

(21) Appl. No.: 17/356,861

(22) Filed: Jun. 24, 2021

(65) Prior Publication Data
US 2021/0326484 A1 Oct. 21, 2021

(30) Foreign Application Priority Data
Aug. 20, 2020 (CN) .......................... 202010842652.5

(51) Int. Cl.
*H04L 29/06* (2006.01)
*G06F 21/64* (2013.01)
*G06F 16/23* (2019.01)

(52) U.S. Cl.
CPC .......... *G06F 21/64* (2013.01); *G06F 16/2379* (2019.01)

(58) Field of Classification Search
CPC .. G06F 21/62; G06F 21/6209; G06F 21/6218; G06F 21/6227; G06F 21/64; G06F 16/1827; G06F 21/44; G06F 21/629; G06F 16/2379; G06F 16/9027; H04L 9/0643; H04L 9/30; H04L 2209/38; H04L 9/0637; H04L 9/0618; H04L 9/3247; H04L 9/3239; H04L 9/3263; H04L 2209/56; H04L 9/0656; G06Q 20/06; G06Q 20/382; G06Q 20/401; G06Q 2220/00; G06Q 20/381; G06Q 40/04; G06Q 20/3825; G06Q 20/3827; G06K 9/00577; G06K 2009/00583
See application file for complete search history.

(56) References Cited

U.S. PATENT DOCUMENTS

| | | | |
|---|---|---|---|
| 10,826,685 B1* | 11/2020 | Campagna | H04L 9/3239 |
| 2018/0165476 A1* | 6/2018 | Carey | G06F 21/577 |
| 2020/0118068 A1* | 4/2020 | Turetsky | G06Q 20/06 |
| 2020/0118096 A1* | 4/2020 | Yang | H04L 9/3247 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Malcolm Cribbs
(74) *Attorney, Agent, or Firm* — Fish & Richardson P.C.

(57) ABSTRACT

One or more embodiments of the present specification relate to data verification methods, apparatuses, and electronic devices. An example method includes obtaining a smart contract from a main chain network, determining, based on the smart contract, a sub-chain network corresponding to the main chain network and including a first blockchain node and a second blockchain node, sending through the sub-chain network, a data verification request that includes data to be verified, receiving a verification result and verification progress information, storing the verification result in the sub-chain network, and storing the verification progress information in the main chain network.

18 Claims, 10 Drawing Sheets

(56) References Cited

U.S. PATENT DOCUMENTS

| | | | |
|---|---|---|---|
| 2020/0177391 A1* | 6/2020 | Qiu | H04L 63/123 |
| 2020/0234293 A1* | 7/2020 | Lee | G06Q 20/38215 |
| 2020/0364708 A1* | 11/2020 | Grube | H04L 9/3239 |
| 2021/0019737 A1* | 1/2021 | Vladi | G06Q 20/381 |

OTHER PUBLICATIONS

Nakamoto, "Bitcoin: A Peer-to-Peer Electronic Cash System," www.bitcoin.org, 2005, 9 pages.

* cited by examiner

DATA VERIFICATION

CROSS-REFERENCE TO RELATED APPLICATIONS

This application claims priority to Chinese Patent Application No. 202010842652.5, filed on Aug. 20, 2020, which is hereby incorporated by reference in its entirety.

TECHNICAL FIELD

Embodiments of the present specification relate to the field of computer technologies, and in particular, to data verification methods, apparatuses, and electronic devices.

BACKGROUND

In a daily application scenario, data verification can determine whether a related business transaction complies with regulations. Generally, according to a data verification requirement of a verifying party, a party under verification provides data to be verified, and the verifying party verifies the data to be verified based on a data verification rule.

SUMMARY

Embodiments of the present specification provide data verification methods, apparatuses, and electronic devices to alleviate a problem in the existing technology that when verification is performed on data to be verified that is provided by different parties under verification, the data is subject to a leakage risk.

The following technical solutions are used in the embodiments of the present specification:

Some embodiments of the present specification provide a data verification method, applied to a first blockchain node and including the following:

A smart contract is obtained from a main chain network including the first blockchain node; a sub-chain network corresponding to the main chain network and including the first blockchain node and a second blockchain node is determined based on the smart contract; a data verification request is sent to the second blockchain node through the sub-chain network, where the data verification request includes data to be verified; a verification result and verification progress information that pass consensus are received from the second blockchain node; the verification result is stored in the sub-chain network; and the verification progress information is stored in the main chain network.

Some embodiments of the present specification further provide a data verification method, applied to a second blockchain node and including the following:

A data verification request sent by a first blockchain node is received through a sub-chain network, where the sub-chain network includes the first blockchain node and the second blockchain node, and the sub-chain network is determined by the first blockchain node based on a smart contract in a main chain network including the first blockchain node; data to be verified that is included in the data verification request is verified based on a predetermined data verification policy, to obtain a verification result and verification progress information; a first consensus request including the verification result is sent to the sub-chain network; if the verification result passes consensus, the verification result is stored in the sub-chain network; a second consensus request including the verification progress information is sent to the main chain network; and if the verification progress information passes consensus, the verification progress information is stored in the main chain network.

Some embodiments of the present specification further provide a data verification system, including: a first blockchain node, configured to obtain a smart contract from a main chain network including the first blockchain node, determine, based on the smart contract, a sub-chain network corresponding to the main chain network and including the first blockchain node and a second blockchain node, send a data verification request including data to be verified to the second blockchain node through the sub-chain network, receive, from the second blockchain node, a verification result and verification progress information that pass consensus, store the verification result in the sub-chain network, and store the verification progress information in the main chain network; and the second blockchain node, configured to receive, through the sub-chain network, the data verification request sent by the first blockchain node, verify, based on a predetermined data verification policy, the data to be verified that is included in the data verification request, send a first consensus request including the verification result to the sub-chain network, send a second consensus request including the verification progress information to the main chain network, store the verification result in the sub-chain network if the verification result passes consensus, and store the verification progress information in the main chain network if the verification progress information passes consensus.

Some embodiments of the present specification further provide a data verification system, including: a first blockchain node, configured to send a sub-chain network construction request to a third blockchain node in a main chain network through the main chain network, receive, from the third blockchain node, identity information of a sub-chain network including the first blockchain node and a second blockchain node, send a data verification request including data to be verified to the second blockchain node through the sub-chain network, receive, from the second blockchain node, a verification result and verification progress information that pass consensus, store the verification result in the sub-chain network, and store the verification progress information in the main chain network; the second blockchain node, configured to receive, from the third blockchain node, the identity information of the sub-chain network including the first blockchain node and the second blockchain node, receive, through the sub-chain network, the data verification request sent by the first blockchain node, verify, based on a predetermined data verification policy, the data to be verified that is included in the data verification request, send a first consensus request including the verification result to the sub-chain network, send a second consensus request including the verification progress information to the main chain network, store the verification result in the sub-chain network if the verification result passes consensus, and store the verification progress information in the main chain network if the verification progress information passes consensus; and the third blockchain node, configured to receive, through the main chain network, the sub-chain network construction request sent by the first blockchain node, trigger a smart contract in the main chain network to construct the sub-chain network including the first blockchain node and the second blockchain node, send the identity information of the sub-chain network to the first blockchain node and the second blockchain node through the main chain network, receive, from the second blockchain node, the verification progress information that passes consensus, and store the verification progress information in the main chain network.

Some embodiments of the present specification further provide a data verification apparatus, applied to a first blockchain node and including: an obtaining module, configured to obtain a smart contract from a main chain network including the first blockchain node; a determining module, configured to determine, based on the smart contract, a sub-chain network corresponding to the main chain network and including the first blockchain node and a second blockchain node; a sending module, configured to send a data verification request to the second blockchain node through the sub-chain network, where the data verification request includes data to be verified; a receiving module, configured to receive, from the second blockchain node, a verification result and verification progress information that pass consensus; a first storage module, configured to store the verification result in the sub-chain network; and a second storage module, configured to store the verification progress information in the main chain network.

Some embodiments of the present specification further provide a data verification apparatus, applied to a second blockchain node and including: a receiving module, configured to receive, through a sub-chain network, a data verification request sent by a first blockchain node, where the sub-chain network includes the first blockchain node and the second blockchain node, and the sub-chain network is determined by the first blockchain node based on a smart contract in a main chain network including the first blockchain node; a verification module, configured to verify, based on a predetermined data verification policy, data to be verified that is included in the data verification request, to obtain a verification result and verification progress information; a first sending module, configured to send a first consensus request including the verification result to the sub-chain network; a first storage module, configured to store the verification result in the sub-chain network if the verification result passes consensus; a second sending module, configured to send a second consensus request including the verification progress information to the main chain network; and a second storage module, configured to store the verification progress information in the main chain network if the verification progress information passes consensus.

Some embodiments of the present specification further provide an electronic device, including at least one processor and a memory, where the memory stores a program, and the at least one processor is configured to perform the following steps:

A smart contract is obtained from a main chain network including a first blockchain node; a sub-chain network corresponding to the main chain network and including the first blockchain node and a second blockchain node is determined based on the smart contract; a data verification request is sent to the second blockchain node through the sub-chain network, where the data verification request includes data to be verified; a verification result and verification progress information that pass consensus are received from the second blockchain node; the verification result is stored in the sub-chain network; and the verification progress information is stored in the main chain network.

Some embodiments of the present specification further provide an electronic device, including at least one processor and a memory, where the memory stores a program, and the at least one processor is configured to perform the following steps:

A data verification request sent by a first blockchain node is received through a sub-chain network, where the sub-chain network includes the first blockchain node and a second blockchain node, and the sub-chain network is determined by the first blockchain node based on a smart contract in a main chain network including the first blockchain node; data to be verified that is included in the data verification request is verified based on a predetermined data verification policy, to obtain a verification result and verification progress information; a first consensus request including the verification result is sent to the sub-chain network; if the verification result passes consensus, the verification result is stored in the sub-chain network; a second consensus request including the verification progress information is sent to the main chain network; and if the verification progress information passes consensus, the verification progress information is stored in the main chain network.

At least one of the previous technical solutions used in the embodiments of the present specification can achieve the following beneficial effects:

The first blockchain node determines the sub-chain network based on the smart contract obtained from the main chain network, where the sub-chain network includes the first blockchain node and the second blockchain node. As such, the first blockchain node can send the data verification request including the data to be verified to the second blockchain node through the sub-chain network, and the second blockchain node verifies the data to be verified. When the first blockchain node receives the verification result and the verification progress information that pass consensus, the first blockchain node stores the verification result in the sub-chain network, and stores the verification progress information in the main chain network.

As such, the data to be verified that is provided by the first blockchain node is verified in the sub-chain network, and the verification result is stored in the sub-chain network. Therefore, the data to be verified is prevented from spreading to other nodes in the main chain network, and data security and privacy are protected. For the main chain network, because each blockchain node can obtain verification progress information of each sub-chain network, supervision and publicity of data verification progress are implemented.

BRIEF DESCRIPTION OF DRAWINGS

The accompanying drawings described here are used to provide a further understanding about the embodiments of the present specification, and constitute a part of the embodiments of the present specification. Exemplary embodiments of the present specification and descriptions thereof are used to explain the present application, but do not constitute any inappropriate limitation on the present application.

DESCRIPTION OF EMBODIMENTS

Figure 1:
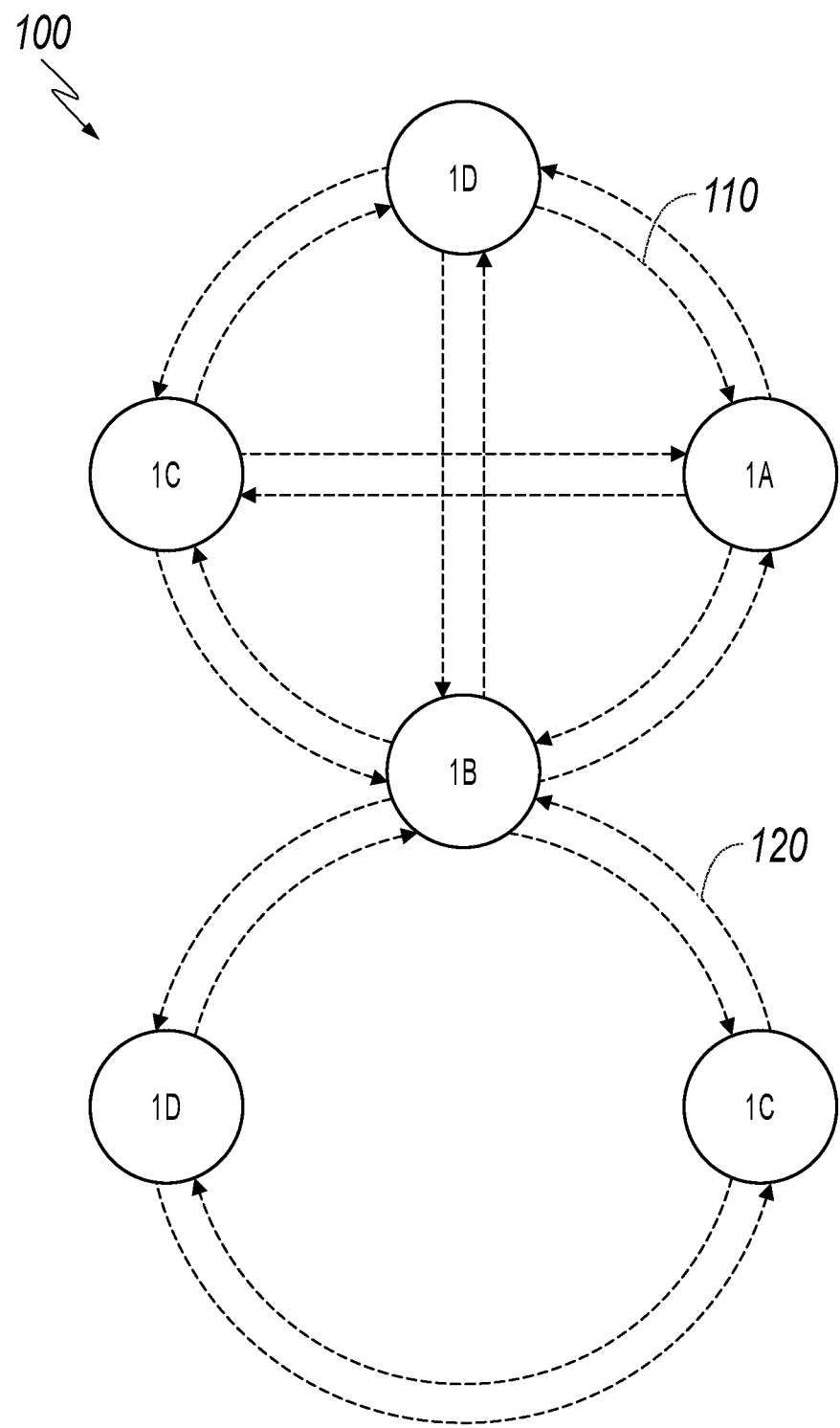
FIG. 1 is a schematic structural diagram illustrating a data verification system, according to some embodiments of the present specification.

According to a predetermined verification rule, a specified verifying party generally verifies data to be verified that is provided by a party under verification. In this case, organizations such as the verifying party and the party under verification are relatively independent, and it is difficult to effectively supervise a verification process.

A policy in the existing technology uses each verifying party and each party under verification to construct a blockchain network and perform data verification in the blockchain network. In this case, all data to be verified that is provided by different parties under verification is made public in the blockchain network.

Therefore, embodiments of the present specification provide data verification methods, apparatuses, and electronic devices. Specific solutions of the embodiments of the present specification include the following: A first blockchain node determines a sub-chain network based on a smart contract obtained from a main chain network, where the sub-chain network includes the first blockchain node and a second blockchain node. As such, the first blockchain node can send a data verification request including data to be verified to the second blockchain node through the sub-chain network, and the second blockchain node verifies the data to be verified. When receiving, from the second blockchain node, a verification result and verification progress information that pass consensus, the first blockchain node stores the verification result in the sub-chain network, and stores the verification progress information in the main chain network.

As such, the data to be verified that is provided by the first blockchain node is verified in the sub-chain network, and the verification result is stored in the sub-chain network. Therefore, the data to be verified is prevented from spreading to other nodes in the main chain network, and data security and privacy are protected. For the main chain network, because each blockchain node can obtain verification progress information of each sub-chain network, supervision and publicity of data verification progress are implemented.

It is worthwhile to note that, a blockchain is in essence a decentralized distributed data storage mode based on peer-to-peer transmission. Specifically, the blockchain is a new application mode based on computer technologies such as a consensus mechanism or an encryption algorithm. It can achieve effects of establishing trust between different blockchain nodes in data verification and obtaining rights and interests, and enhance security, reliability, and non-tamperability of a data verification process.

With reference to the smart contract on the blockchain, verification and supervision of the data to be verified in the embodiments of the present specification can be implemented.

The smart contract (Smart contract) is a computer protocol intended for information propagation or verification or execution of a contract, and allows trusted transactions without a third party. The transactions can be tracked and are irreversible. A smart contract is a set of commitments defined in a digital form, and includes protocols that allow contract participants to fulfill the commitments.

To make the objectives, technical solutions, and advantages of the present application clearer, the following clearly and comprehensively describes the technical solutions of the present application with reference to specific embodiments and accompanying drawings of the present specification. Clearly, the described embodiments are merely some rather than all of the embodiments of the present specification. All other embodiments obtained by a person of ordinary skill in the art based on the embodiments of the present specification without creative efforts shall fall within the protection scope of the present application.

The technical solutions provided in the embodiments of the present specification are described in detail below with reference to the accompanying drawings.

FIG. 1 is a schematic structural diagram illustrating a data verification system, according to some embodiments of the present specification.

A data verification system provided by some embodiments of the present specification can include the following:

The data verification system can be a blockchain network 100 created based on several blockchain nodes. The blockchain network 100 can include a main chain network 110 and a sub-chain network 120. The main chain network 110 is regarded as a consortium chain, and the sub-chain network 120 is regarded as a private chain.

The main chain network 110 can include blockchain nodes 1A, 1B, 1C, and 1D. The blockchain nodes can correspond to parties verifying data or parties whose data is verified. Implementations are not specifically limited here.

The sub-chain network 120 includes some blockchain nodes in the main chain network 110. As shown in FIG. 1, the blockchain nodes 1B, 1C, and 1D in the main chain network 110 constitute the sub-chain network 120. Therefore, the same blockchain nodes 1B, 1C, and 1D included in the main chain network 110 and the sub-chain network 120 in FIG. 1 represent a blockchain network that the blockchain nodes are allocated to.

Quantities of blockchain nodes configured in the main chain network and the sub-chain network are not limited by the embodiment shown in FIG. 1. Specifically, more or fewer blockchain nodes can be configured. The quantities are not specifically limited here.

As shown in FIG. 1, the main chain network 110 corresponds to one sub-chain network 120. In different embodiments, a plurality of sub-chain networks can also be constructed based on different parties under verification in actual application scenarios. As such, data to be verified of different parties under verification in different sub-chain networks is verified separately, the data to be verified of different parties under verification and verification processes are isolated, data to be verified in a specified sub-chain network is not propagated in the main chain network and other sub-chain networks, security of data verification can be ensured, and leakage of the data to be verified of the parties under verification is alleviated.

Figure 2:
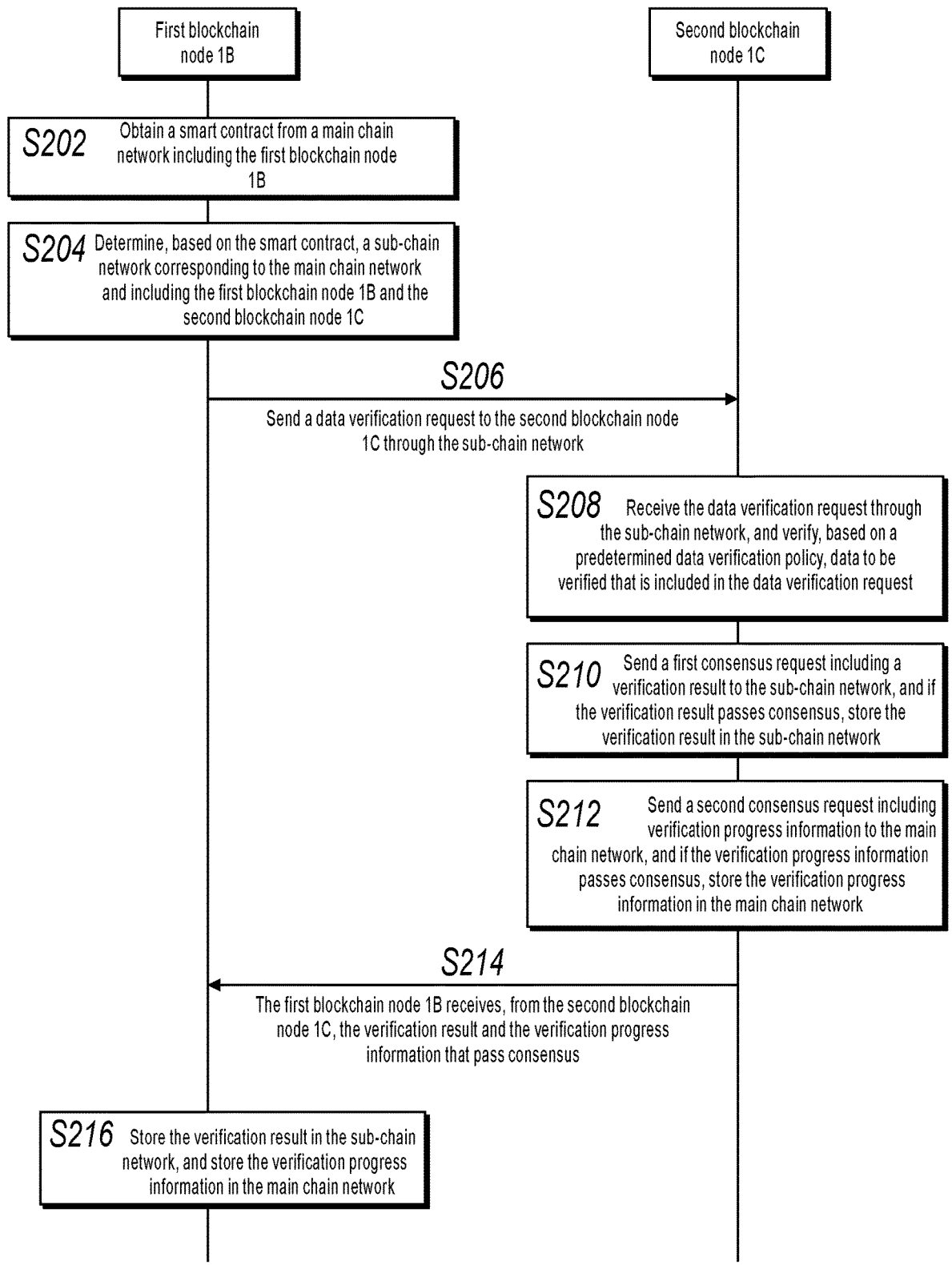
FIG. 2 is a time sequence diagram illustrating a data verification method based on the data verification system shown in FIG. 1, according to some embodiments of the present specification.

FIG. 2 is a time sequence diagram illustrating a data verification method based on the data verification system shown in FIG. 1, according to some embodiments of the present specification. A blockchain node 1B is marked as a first blockchain node, and a blockchain node 1C is marked as a second blockchain node.

Step 202: A first blockchain node 1B obtains a smart contract from a main chain network including the first blockchain node 1B.

Step 204: The first blockchain node 1B determines, based on the smart contract, a sub-chain network corresponding to the main chain network and including the first blockchain node 1B and a second blockchain node 1C.

Step 206: The first blockchain node 1B sends a data verification request to the second blockchain node 1C through the sub-chain network, where the data verification request includes data to be verified.

Step 208: The second blockchain node 1C receives the data verification request through the sub-chain network, and verifies, based on a predetermined data verification policy, the data to be verified that is included in the data verification request.

Step 210: The second blockchain node 1C sends a first consensus request including a verification result to the sub-chain network, and if the verification result passes consensus, stores the verification result in the sub-chain network.

Step 212: The second blockchain node 1C sends a second consensus request including verification progress information to the main chain network, and if the verification progress information passes consensus, stores the verification progress information in the main chain network.

Step 214: The first blockchain node 1B receives, from the second blockchain node 1C, the verification result and the verification progress information that pass consensus.

Step 216: Store the verification result in the sub-chain network, and store the verification progress information in the main chain network. Specifically, the second blockchain node 1C sends a consensus result about the verification result and the verification progress information to the first blockchain node 1B. The first blockchain node 1B stores the verification result in the sub-chain network, and stores the verification progress information in the main chain network.

Figure 3:
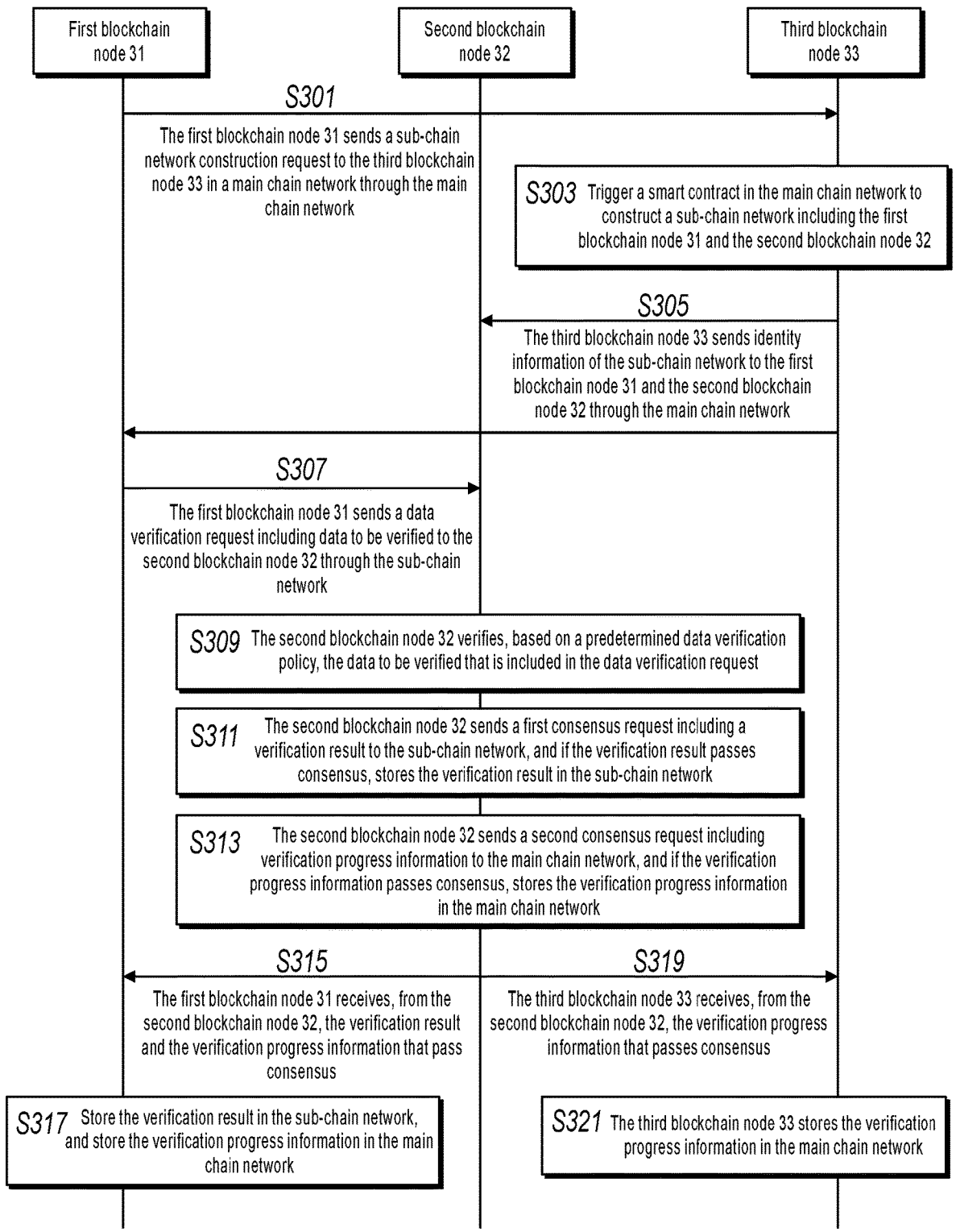
FIG. 3 is a time sequence diagram illustrating another data verification method based on a data verification system, according to some embodiments of the present specification.

Based on the same inventive concept, some embodiments of the present specification further provide a time sequence diagram illustrating another data verification method based on a data verification system, as shown in FIG. 3. The data verification system includes a first blockchain node, a second blockchain node, and a third blockchain node.

Step 301: A first blockchain node 31 sends a sub-chain network construction request to a third blockchain node 33 in a main chain network through the main chain network.

Step 303: When the third blockchain node 33 receives, through the main chain network, the sub-chain network construction request sent by the first blockchain node 31, the third blockchain node 33 triggers a smart contract in the main chain network to construct a sub-chain network including the first blockchain node 31 and a second blockchain node 32.

Step 305: The third blockchain node 33 sends identity information of the sub-chain network to the first blockchain node 31 and the second blockchain node 32 through the main chain network.

Step 307: The first blockchain node 31 receives, from the third blockchain node 33, the identity information of the sub-chain network including the first blockchain node 31 and the second blockchain node 32, and sends a data verification request including data to be verified to the second blockchain node 32 through the sub-chain network.

Step 309: The second blockchain node 32 receives, from the third blockchain node 33, the identity information of the sub-chain network including the first blockchain node 31 and the second blockchain node 32, receives, through the sub-chain network, the data verification request sent by the first blockchain node 31, and verifies, based on a predetermined data verification policy, the data to be verified that is included in the data verification request.

Step 311: The second blockchain node 32 sends a first consensus request including a verification result to the sub-chain network, and if the verification result passes consensus, stores the verification result in the sub-chain network.

Step 313: The second blockchain node 32 sends a second consensus request including verification progress information to the main chain network, and if the verification progress information passes consensus, stores the verification progress information in the main chain network.

Step 315: The first blockchain node 31 receives, from the second blockchain node 32, the verification result and the verification progress information that pass consensus.

Step 317: The first blockchain node 31 stores the verification result in the sub-chain network, and stores the verification progress information in the main chain network.

Step 319: The third blockchain node 33 receives, from the second blockchain node 32, the verification progress information that passes consensus.

Step 321: The third blockchain node 33 stores the verification progress information in the main chain network.

Figure 4:
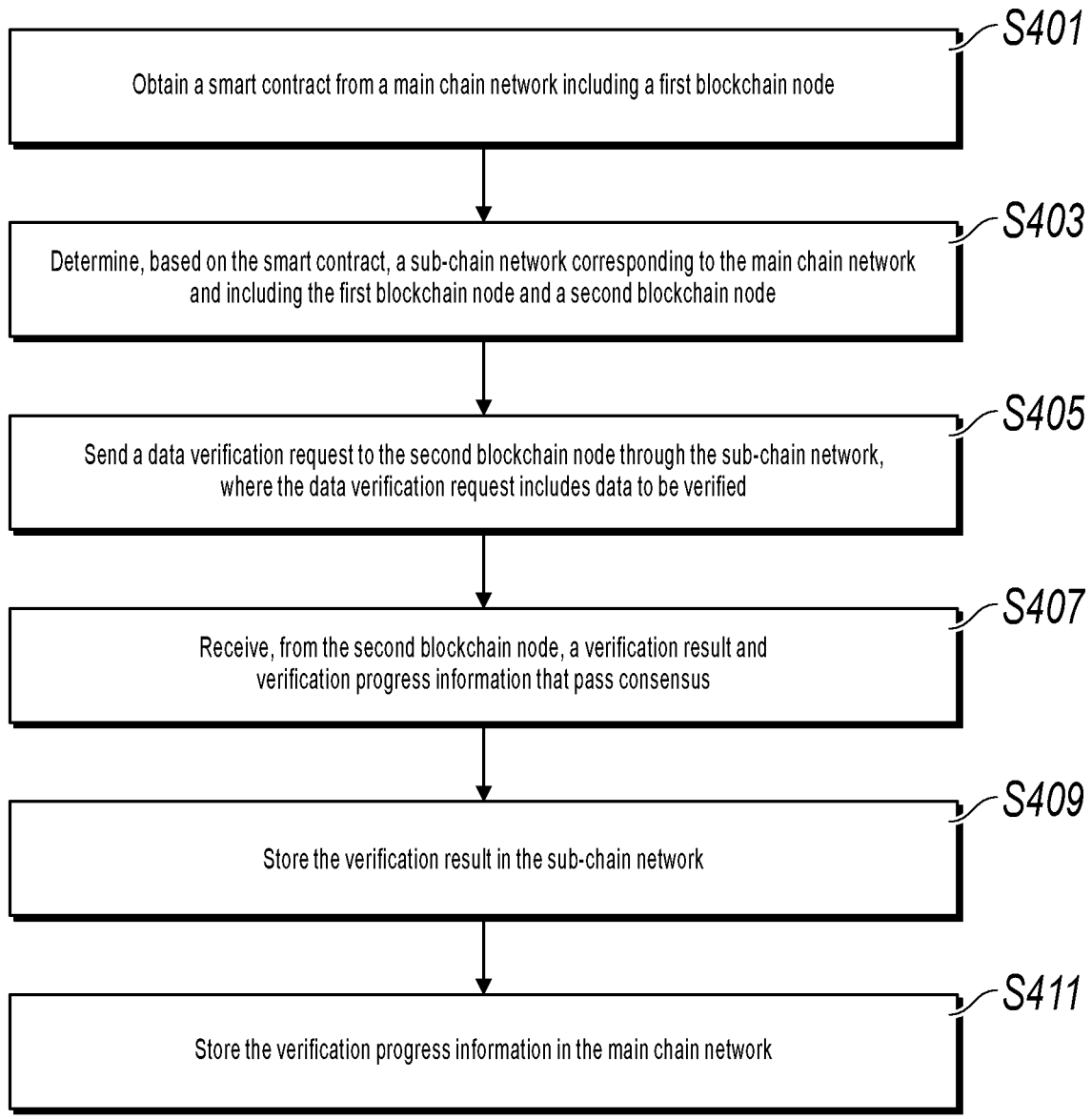
FIG. 4 is a schematic flowchart illustrating a data verification method, according to some embodiments of the present specification.

FIG. 4 is a schematic flowchart illustrating a data verification method, according to some embodiments of the present specification. The data verification method is performed by a first blockchain node, where the first blockchain node represents a party under verification.

S401. Obtain a smart contract from a main chain network including the first blockchain node.

In the embodiments of the present specification, the first blockchain node can be understood as a blockchain node corresponding to a party under verification that will be verified, and specifically can be an institution such as a merchant or an enterprise, and is not specifically limited here.

The smart contract can be understood as a verification contract agreed upon by a verifying party and the party under verification, for performing data verification in a blockchain network, and can specifically include a data verification policy, a verification metric, a verification node allocation policy, a supervision policy, etc., and is not specifically limited here.

The data verification policy can be a verification standard for verifying data to be verified by a second blockchain node. The verification metric can be a specific verification rule in the data verification policy. The verification node allocation policy can be an allocation standard for allocating each second blockchain node, and can be specifically determining a verification task based on a service type corresponding to the data to be verified, and allocating each second blockchain node based on the verification task. The supervision policy can be a rule for supervising a verification process in a sub-chain network by each blockchain node in the main chain network based on verification progress information.

S403. Determine, based on the smart contract, a sub-chain network corresponding to the main chain network and including the first blockchain node and the second blockchain node.

In the embodiments of the present specification, the determining, based on the smart contract, a sub-chain network corresponding to the main chain network can be specifically constructing a sub-chain network including the first blockchain node, or obtaining a historical sub-chain network based on the smart contract, or in other ways, and is not specifically limited here.

In an application embodiment, the determining, based on the smart contract, a sub-chain network corresponding to the main chain network and including the first blockchain node and the second blockchain node can include: sending a sub-chain network construction request to the main chain network; and receiving identity information of the constructed sub-chain network.

The sub-chain network construction request can be understood as request information of the first blockchain node requesting to construct the sub-chain network including the first blockchain node. Sending the sub-chain network construction request to the main chain network by the first blockchain node can be specifically sending the sub-chain network construction request to a third blockchain node in the main chain network, so that the third blockchain node triggers the smart contract in the main chain network to process the sub-chain network construction request, to construct the sub-chain network including the first blockchain node.

The triggering process can be specifically that the third blockchain node triggers the verification node allocation policy in the smart contract to determine at least one second blockchain node in the sub-chain network to be constructed. The second blockchain node can be a verification node.

The identity information of the sub-chain network can be used to represent the constructed sub-chain network. When the first blockchain node receives the identity information of the sub-chain network, it indicates that construction of the sub-chain network including the first blockchain node is completed. Specifically, after completing construction of the sub-chain network, the third blockchain node can send the generated identity information of the sub-chain network to the first blockchain node.

Further, after receiving the identity information of the constructed sub-chain network, the method can further include: configuring a sub-chain ledger corresponding to the identity information of the sub-chain network.

Generation of an identity of the sub-chain network and construction of the sub-chain ledger corresponding to the identity of the sub-chain network indicate that construction of the sub-chain network is completed. Each blockchain node in the sub-chain network can construct a sub-chain ledger for storing data to be verified in the sub-chain network.

In an application embodiment, before sending the sub-chain network construction request to the main chain network, the method can further include: obtaining identity information of at least one second blockchain node in the main chain network based on the smart contract; and generating the sub-chain network construction request based on the identity information of the at least one second blockchain node.

In the embodiments of the present specification, the identity information of the second blockchain node can be used to represent the second blockchain node. The sub-chain network construction request is generated based on the identity information of the second blockchain node, so that the third blockchain node receiving the sub-chain network construction request can trigger the smart contract to verify the identity information of the second blockchain node based on the verification node allocation policy, to determine the second blockchain node included in the sub-chain network to be constructed.

In specific application embodiments, the first blockchain node can select at least one second blockchain node from the main chain network based on the verification node allocation policy in the smart contract, to request the third blockchain node to construct the sub-chain network.

Specifically, the first blockchain node can send the sub-chain network construction request to the main chain network based on the smart contract, where the sub-chain network construction request can include at least one of the at least one determined second blockchain node and the service type of the data to be verified. When the sub-chain network construction request passes consensus, the third blockchain node in the main chain network can determine the sub-chain network including the first blockchain node and the at least one second blockchain node.

Or, the first blockchain node can use the sub-chain network construction request to cause the third blockchain node to trigger the smart contract to construct the sub-chain network. During construction, the smart contract can be triggered to determine, based on the verification node allocation policy, at least one second blockchain node included in the sub-chain network to be constructed. After the determined second blockchain node confirms the sub-chain network construction request, a trusted sub-chain network can be obtained.

Further, obtaining the identity information of the at least one second blockchain node in the main chain network can include: determining the service type corresponding to the data to be verified; and obtaining, based on the smart contract, the identity information of the at least one second blockchain node corresponding to the service type in the main chain network.

Because the service type of the data to be verified is determined, a verification node allocation policy corresponding to the service type can be determined, and the second blockchain node participating in the data verification process of the service type can be determined.

Because the verification node allocation policy is related to the service type of the data to be verified, the first blockchain node can obtain, based on the verification node allocation policy after determining the service type of the data to be verified, the at least one second blockchain node corresponding to the service type. The at least one obtained second blockchain node can come from the main chain network. A specific obtaining process is described in the previous embodiments, and is omitted here for simplicity.

In other application embodiments, the second blockchain node can be specifically a third-party verification node. The first blockchain node can further specify the third-party verification node to participate in the data verification process of the sub-chain network. The third-party verification node is a third-party institution independent of the verifying party and the party under verification, can be specifically a third-party institution having a business relationship with the party under verification, and is configured to verify business transaction data generated in a business process of the party under verification with the third-party institution. The business transaction data can be a part of the data to be verified.

In this application scenario, the first blockchain node can directly specify, in the sub-chain network construction request, the third-party verification node participating in verification. The third blockchain node triggers the smart contract to verify the third-party verification node. After the third-party verification node confirms confirmation request information of the sub-chain network, the third-party verification node can participate in verification of the business transaction data in the sub-chain network.

For example, the party under verification generally performs cooperation with a specified bank in a daily business transaction process. For account statement data generated by the party under verification in the specified bank, the specified bank can verify authenticity of the account statement data, etc. In this case, the party under verification can specify the specified bank as a third-party verification node. After verification of the smart contract and confirmation of the specified bank, the third-party verification node can be used as a second blockchain node to construct a sub-chain ledger locally and perform data verification of data to be verified that is related to the account statement data in the sub-chain network.

In another application embodiment, determining, based on the smart contract, the sub-chain network corresponding to the main chain network and including the first blockchain node and the second blockchain node can include: determining whether a historical sub-chain network constructed based on the first blockchain node is stored in the main chain network; and if yes, determining the sub-chain network based on the historical sub-chain network.

In the embodiments of the present specification, the historical sub-chain network can be a constructed sub-chain network stored in the main chain network, that is, a historical sub-chain network constructed during previous data verification of the first blockchain node. In this case, the sub-chain network for performing the current data verification can be directly determined based on the historical sub-chain network.

Further, determining the sub-chain network based on the historical sub-chain network includes: if the smart contract includes update information of identity information of a second blockchain node in the historical sub-chain network, determining the sub-chain network based on the update information.

Because a data verification policy update, etc. may exist in the smart contract, the second blockchain node in the historical sub-chain network can also be updated correspondingly. Therefore, some blockchain nodes in the historical sub-chain network can be updated, to determine the sub-chain network for performing the current data verification process, to ensure that the data verification process is performed securely and effectively.

Specifically, triggering the smart contract to update the historical sub-chain network information can include: determining identity information of the second blockchain node based on the historical sub-chain network information; and triggering the smart contract to update the identity information of the second blockchain node, to obtain the sub-chain network including the updated second blockchain node.

For the same first blockchain node, updating the historical sub-chain network can be updating the second blockchain node included in the historical sub-chain network.

In specific application embodiments, a corresponding update and replacement can be performed on the second blockchain node in the historical sub-chain network based on the existing smart contract. Further, the third-party verification node can be updated. For example, when the party under verification changes a bank having a transaction relationship, the third-party verification node in the sub-chain network can be updated correspondingly.

S405. Send a data verification request to the second blockchain node through the sub-chain network, where the data verification request includes the data to be verified.

In the embodiments of the present specification, the first blockchain node sends the data verification request to the second blockchain node to trigger the data verification process in the sub-chain network, so that the second blockchain node uses the smart contract to perform data verification on the received data to be verified.

S407. Receive, from the second blockchain node, a verification result and verification progress information that pass consensus.

In the embodiments of the present specification, the verification result can be a verification result after the second blockchain node in the sub-chain network verifies the data to be verified, and specifically can be a result of determining authenticity of the account statement data by the specified bank as a third-party verification node, a result of verifying regulatory compliance of the business transaction data by a supervision institution, etc. The verification result is not specifically limited here.

The verification progress information can be verification process data in the verification of the data to be verified by the blockchain node, and specifically can be a verification start time, a verification end time, a verification completion degree, etc., and is not specifically limited here.

S409. Store the verification result in the sub-chain network.

Because the verification result may include data to be verified that needs to be kept secret by the party under verification, in this case, the verification result needs to be prevented from being propagated in the main chain network.

The process of storing the verification result in the sub-chain network can be specifically as follows: After a consensus node in the sub-chain network performs consensus on the verification node sent by the second blockchain node, the verification result that passes consensus can be stored in the sub-chain network, that is, block data including the verification result is formed, and the block data is stored in the sub-chain ledger corresponding to the sub-chain network.

S411. Store the verification progress information in the main chain network.

The verification progress information is stored in the main chain network, that is, stored in a main chain ledger corresponding to the main chain network, so that the main chain network can further supervise the verification process in the sub-chain network based on the verification progress information, while the data to be verified that needs to be kept secret by the party under verification is not made public in the main chain network.

The process of storing the verification progress information in the main chain network can be as follows: After completing the verification process, the second blockchain node generates the verification progress information based on the smart contract, and sends the verification progress information to the main chain network, to trigger the smart contract to evaluate the verification progress information based on the supervision policy, and then the consensus node performs consensus on an evaluation result. The evaluation result and/or the verification progress information can be stored in the main chain network, that is, block data including the evaluation result and/or the verification progress information is formed, and the block data is stored in the main chain ledger corresponding to the main chain network.

According to the data verification method provided in the embodiments of the present specification, the first blockchain node determines the sub-chain network based on the smart contract obtained from the main chain network, where the sub-chain network includes the first blockchain node and the second blockchain node. As such, the first blockchain node can send the data verification request including the data to be verified to the second blockchain node through the sub-chain network, and the second blockchain node verifies the data to be verified. When the first blockchain node receives the verification result and the verification progress information that pass consensus, the first blockchain node stores the verification result in the sub-chain network, and stores the verification progress information in the main chain network.

As such, the data to be verified that is provided by the first blockchain node is verified in the sub-chain network, and the verification result is stored in the sub-chain network. Therefore, the data to be verified is prevented from spreading to other nodes in the main chain network, and data security and privacy are protected. For the main chain network, because each blockchain node can obtain verification progress information of each sub-chain network, supervision and publicity of data verification progress are implemented.

Figure 5:
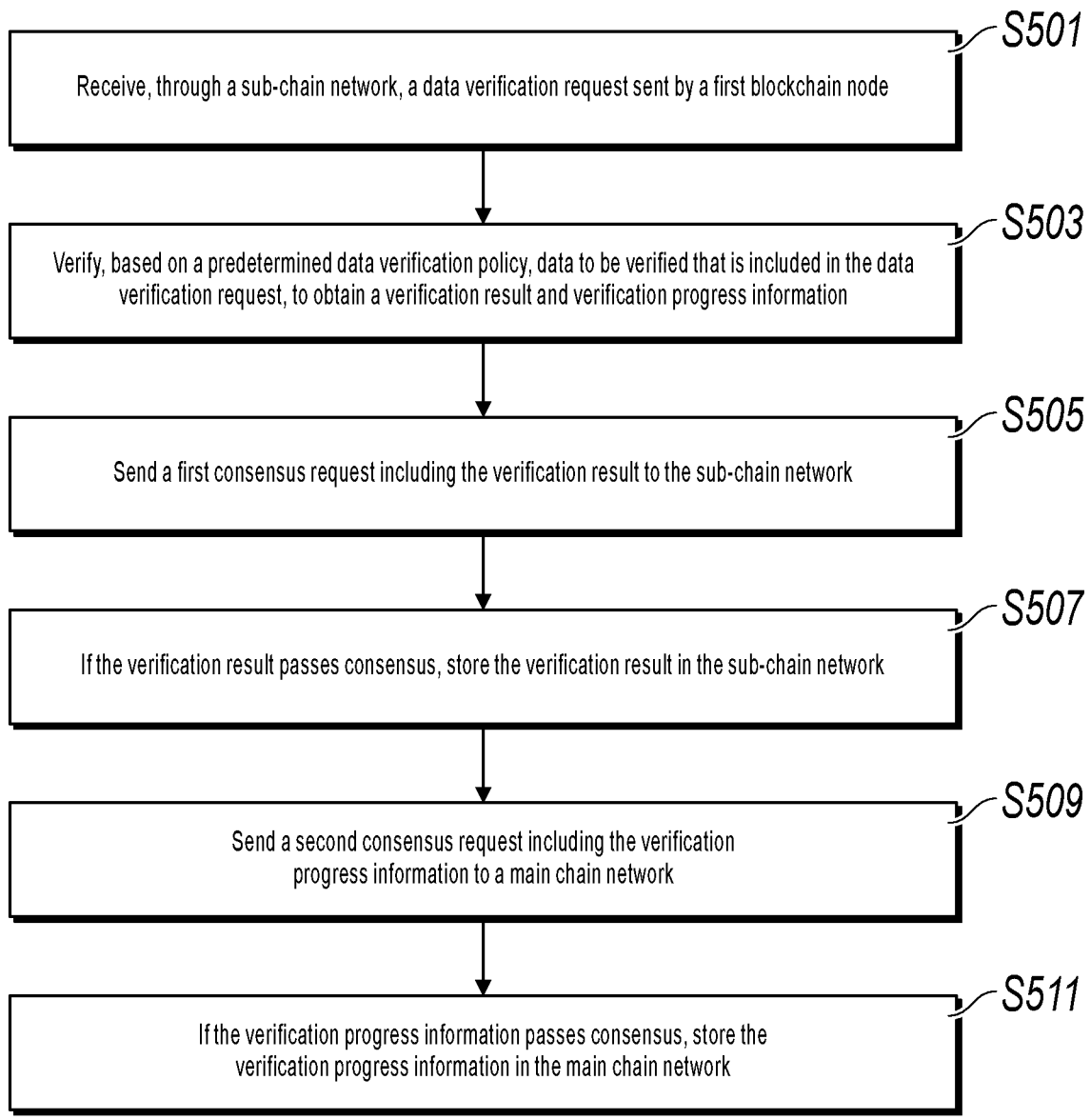
FIG. 5 is a schematic flowchart illustrating a data verification method, according to some embodiments of the present specification.

FIG. 5 is a schematic flowchart illustrating a data verification method, according to some embodiments of the present specification. In the embodiments of the present specification, a second blockchain node is used as an execution body, and the second blockchain node represents a verifying party.

S501. Receive, through a sub-chain network, a data verification request sent by a first blockchain node, where the sub-chain network includes the first blockchain node and a second blockchain node, and the sub-chain network is determined by the first blockchain node based on a smart contract in a main chain network including the first blockchain node.

In the embodiments of the present specification, the second blockchain node can be understood as a verification node performing data verification, and can be specifically a supervision institution, etc. The supervision institution can include an assisting supervision institution, for example, a third-party supervision institution, and is not specifically limited here.

In an application embodiment, before receiving, through the sub-chain network, the data verification request sent by the first blockchain node, the method can further include: receiving, through the main chain network, a confirmation request for confirming construction of the sub-chain network, where the confirmation request includes identity information of the first blockchain node and the second blockchain node; sending confirmation information for the confirmation request; and receiving identity information of the constructed sub-chain network.

In the embodiments of the present specification, in the main chain network, after a third blockchain node triggers the smart contract to verify a sub-chain network construction request to obtain at least one second blockchain node included in the sub-chain network to be constructed, the third blockchain node can send a confirmation request for confirming construction of the sub-chain network to the at least one second blockchain node. The second blockchain node performs confirmation to construct a trusted sub-chain network.

Further, after receiving the identity information of the constructed sub-chain network, the method can further include: configuring a sub-chain ledger corresponding to the identity information of the sub-chain network.

After the sub-chain network is determined, the second blockchain node forms the sub-chain ledger corresponding to the sub-chain network, and is associated with other blockchain nodes in the sub-chain network at a communication layer, to perform coordinated data verification in the sub-chain network.

S503. Verify, based on a predetermined data verification policy, data to be verified that is included in the data verification request, to obtain a verification result and verification progress information.

In the embodiments of the present specification, the predetermined data verification policy can be understood as a verification rule for verifying, by the second blockchain node, the data to be verified, and can be specifically at least one of data verification measurement included in the smart contract and a data verification policy stored in a database of the second blockchain node, and is not specifically limited here.

In an application embodiment, before verifying, based on the predetermined data verification policy, the data to be verified, the method can further include: obtaining the smart contract from the main chain network; and extracting the predetermined data verification policy from the smart contract.

In the embodiments of the present specification, the predetermined data verification policy can be extracted from the smart contract. A specific meaning of the predetermined data verification policy is described in the previous embodiments, and is omitted here for simplicity.

The second blockchain node can obtain the smart contract from the main chain network. There is no need to construct, in the sub-chain network, a smart contract for performing data verification in the sub-chain network. Therefore, the data verification process is simplified. As such, when receiving the data verification request sent by the first blockchain node, the second blockchain node can trigger the smart contract to verify the data to be verified and generate a verification result, and efficiency of data verification is improved.

In another application embodiment, before verifying, based on the predetermined data verification policy, the data to be verified, the method can further include: obtaining the predetermined data verification policy from the database of the second blockchain node.

The predetermined data verification policy stored in the database of the second blockchain node can refer to a data verification rule established by a verifying party corresponding to the second blockchain node based on a data verification service of the verifying party, and specifically can be a verification rule for verifying the specified data to be verified. The data verification policy is different from the data verification policy included in the smart contract.

The second blockchain node can verify, based on the predetermined data verification policy obtained from the database of the second blockchain node, the received data to be verified, and can perform mutual verification with the verification result of the verification performed by using the smart contract, to improve reliability of the verification result.

Further, verifying, based on the predetermined data verification policy obtained from the database of the second blockchain node, the received data to be verified can include: after verifying, based on the smart contract obtained from the main chain network, some data to be verified, verifying, based on the obtained predetermined data verification policy, data to be verified that is not verified based on the smart contract.

In the embodiments of the present specification, specified data that cannot be verified by using the data verification policy in the smart contract may exist in the data to be verified. In this case, the specified data needs to be verified by using the predetermined data verification policy stored in the database of the second blockchain node.

In another application embodiment, verifying, based on the predetermined data verification policy obtained from the database of the second blockchain node, the received data to be verified can include: if the sub-chain network includes at least two second blockchain nodes, where the at least two blockchain nodes correspond to different data to be verified, verifying, based on a verification result of another second blockchain node for corresponding data to be verified and based on the predetermined data verification policy obtained from the database of the second blockchain node, the data to be verified.

In the embodiments of the present specification, when the sub-chain network includes at least two second blockchain nodes, different second blockchain nodes are responsible for verification of different data to be verified. In this case, the second blockchain node may need to perform further data verification with reference to a data verification result of another second blockchain node.

For example, the second blockchain node verifies business transaction data in the data to be verified. In this case, the verification needs to be performed with reference to a verification result of corresponding account statement data. Therefore, after another second blockchain node verifies the account statement data, the business transaction data is verified with reference to the verification result.

S505. Send a first consensus request including the verification result to the sub-chain network.

In the embodiments of the present specification, after completing data verification, the second blockchain node can generate the verification result, and send the first consensus request to the sub-chain network, that is, send the first consensus request to a consensus node in the sub-chain network, to perform consensus on the verification result, for determining reliability of the verification result.

S507. If the verification result passes consensus, store the verification result in the sub-chain network.

The consensus node in the sub-chain network performs consensus on the received first consensus request, and performs network-wide trusted consensus on the verification result. After passing consensus, the verification result can be stored in the sub-chain network, that is, block data including the verification result is formed, and the block data is stored in the sub-chain ledger in the sub-chain network corresponding to the second blockchain node.

S509. Send a second consensus request including the verification progress information to the main chain network.

In the embodiments of the present specification, a specific meaning of the verification progress information is the same as a specific meaning in the previous embodiments. Details are omitted here for simplicity.

In the embodiments of the present specification, after completing data verification, the second blockchain node can generate corresponding verification progress information, and send the second consensus request to the main chain network, that is, send the second consensus request to a consensus node in the main chain network, to perform consensus on the verification progress information, for determining reliability of the verification progress information.

In an application embodiment, before sending the second consensus request including the verification progress information to the main chain network, the method can further include: triggering the smart contract to evaluate the verification progress information, to obtain an evaluation result; and generating the second consensus request based on the evaluation result; and sending the second consensus request including the verification progress information to the main chain network includes: sending the second consensus request including the evaluation result to the main chain network, where the evaluation result includes the verification progress information.

If the evaluation result passes consensus in the main chain network, the evaluation result is stored in the main chain network.

Specifically, after completing verification and generating the verification progress information, the second blockchain node triggers the smart contract to evaluate the verification progress information based on a supervision policy, for example, scores the verification process of the second blockchain node based on the verification progress information, and evaluates efficiency of data verification of the second blockchain node based on a scoring result.

S511. If the second consensus request passes consensus in the main chain network, store the verification progress information in the main chain network.

The verification progress information that passes consensus is stored in the main chain network, that is, stored in a main chain ledger corresponding to the main chain network, so that each blockchain node in the main chain network supervises the verification process in the sub-chain network based on the verification progress information.

According to the data verification method provided in the embodiments of the present specification, the first blockchain node determines the sub-chain network based on the smart contract obtained from the main chain network, where the sub-chain network includes the first blockchain node and the second blockchain node. As such, the first blockchain node can send the data verification request including the data to be verified to the second blockchain node through the sub-chain network, and the second blockchain node verifies the data to be verified. When the first blockchain node receives the verification result and the verification progress information that pass consensus, the first blockchain node stores the verification result in the sub-chain network, and stores the verification progress information in the main chain network.

As such, the data to be verified that is provided by the first blockchain node is verified in the sub-chain network, and the verification result is stored in the sub-chain network. Therefore, the data to be verified is prevented from spreading to other nodes in the main chain network, and data security and privacy are protected. For the main chain network, because each blockchain node can obtain verification progress information of each sub-chain network, supervision and publicity of data verification progress are implemented.

Based on the same inventive concept, some embodiments of the present specification further provide a data verification method. A specific application scenario used in the data verification method is that a supervision party supervises data of a party under supervision.

In this case, a main chain network further includes a supervision node corresponding to a supervision party in addition to a first blockchain node corresponding to a party under supervision and at least one second blockchain node corresponding to an assisting supervision party.

The supervision node can be configured to create a supervision metric, create a data verification policy, create a verification node allocation policy, supervise a data verification process in a sub-chain network, etc. A time sequence diagram of a specific implementation process of the supervision node is shown in the following FIG. 6 to FIG. 8.

Figure 6:
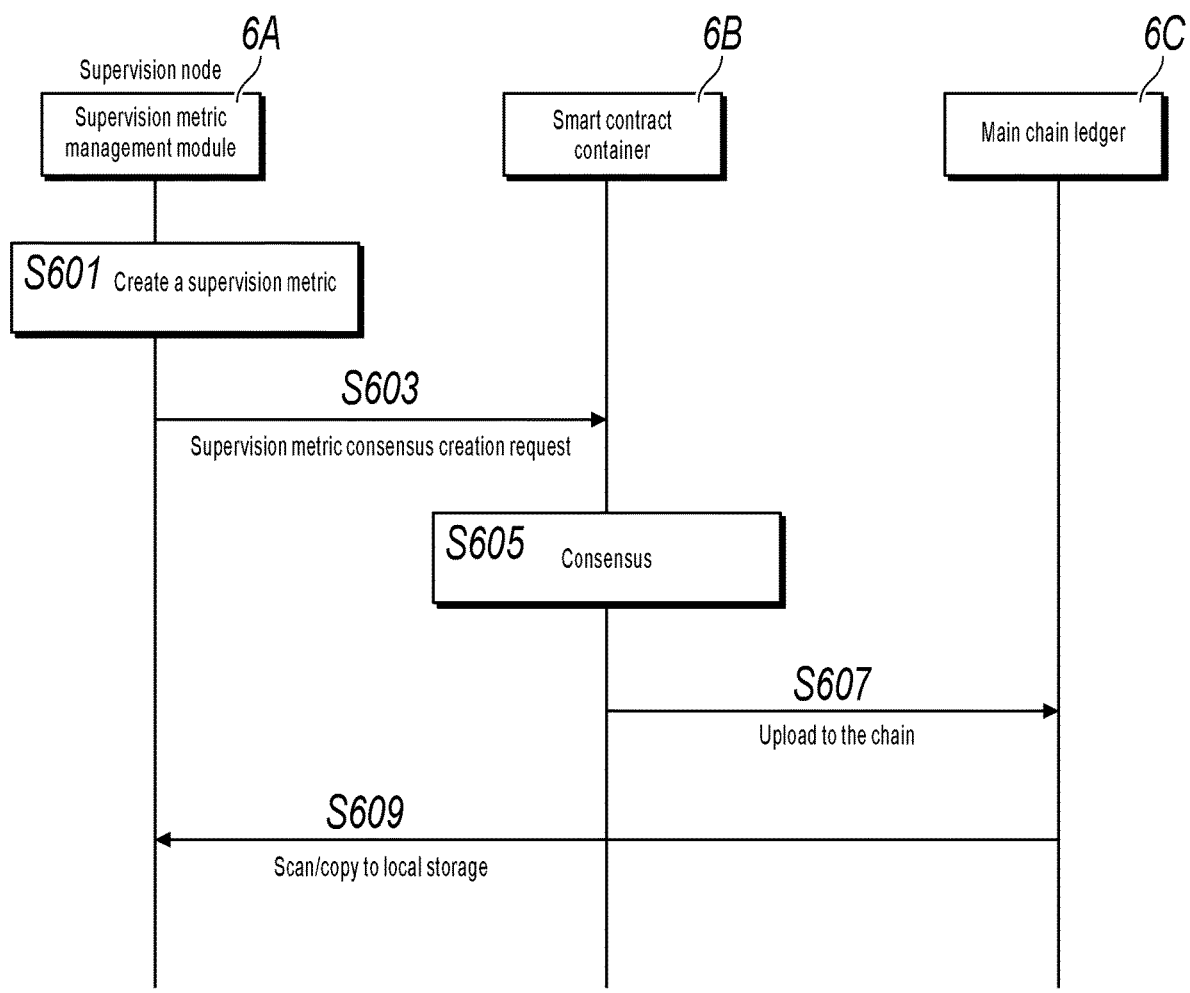
FIG. 6 is a time sequence diagram illustrating creation of a supervision metric in a data verification method, according to some embodiments of the present specification.

FIG. 6 is a time sequence diagram illustrating creation of a data supervision metric in a data verification method, according to some embodiments of the present specification. In the embodiments of the present specification, a supervision node can be configured with a supervision metric management module, a smart contract container, a main chain ledger, etc. The scope of the embodiments of the present specification is not limited to this.

S601. A supervision metric management module 6A in a supervision node creates a supervision metric.

In the embodiments of the present specification, the created supervision metric can include a definition of the supervision metric, an explanation of the supervision metric or a description of the supervision metric, remark information of the supervision metric, the basis of a created policy of the supervision metric, etc.

S603. The supervision metric management module 6A sends a supervision metric creation consensus request to another blockchain node in a main chain network, where the supervision metric creation consensus request includes the supervision metric created in step S601.

S605. The another blockchain node in the main chain network uses a smart contract container 6B to perform consensus on the supervision metric creation consensus request.

S607. Upon completion of consensus, the another blockchain node in the main chain network uploads the supervision metric to the chain, that is, stores the supervision metric in a main chain ledger 6C corresponding to the main chain network.

S609. The supervision metric management module 6A scans/copies the supervision metric from the main chain ledger 6C to a local database.

Figure 7:
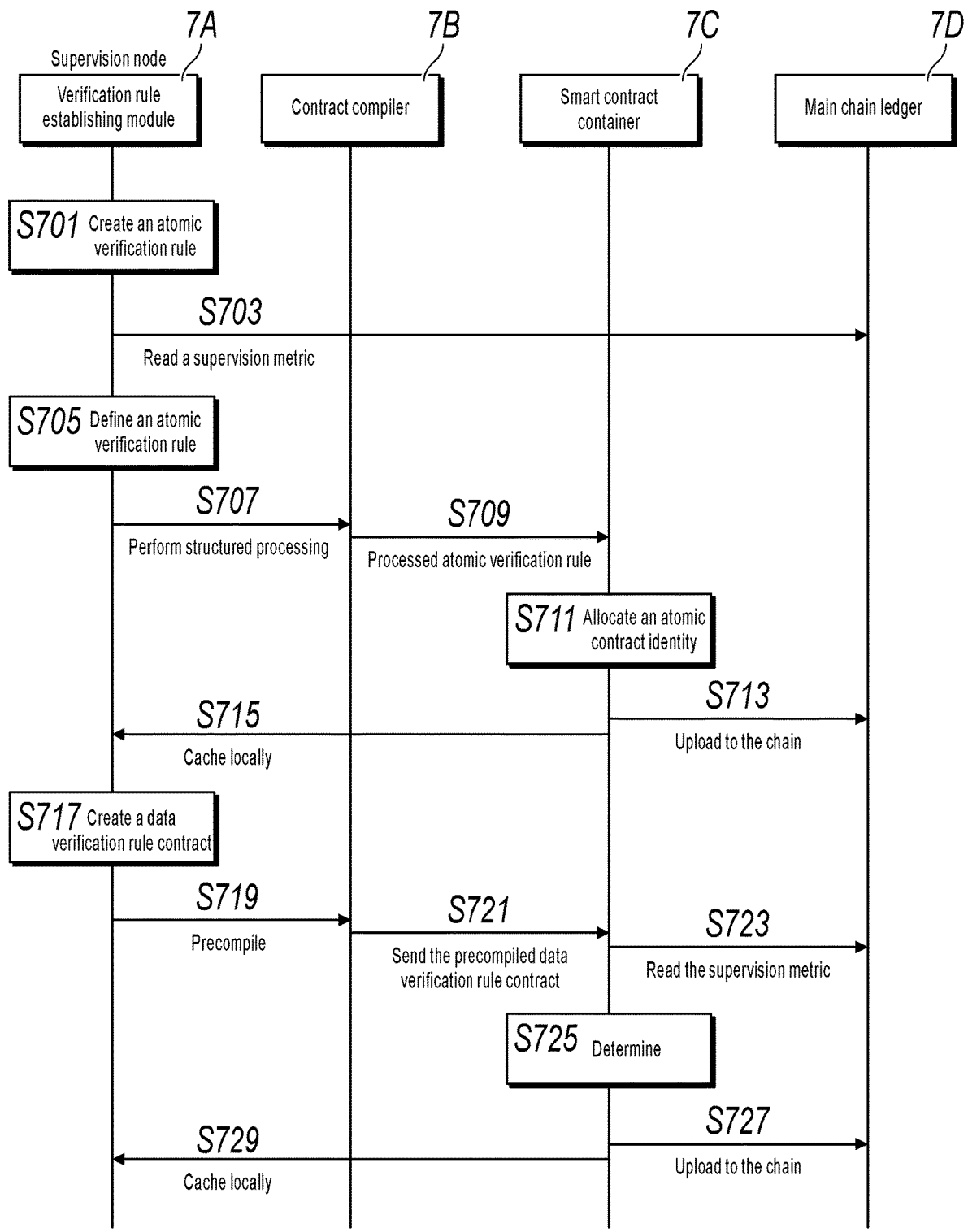
FIG. 7 is a time sequence diagram illustrating creation of a data verification rule contract in a data verification method, according to some embodiments of the present specification.

FIG. 7 is a time sequence diagram illustrating creation of a verification rule in a data verification method, according to some embodiments of the present specification. In the embodiments of the present specification, the supervision node is configured with a verification rule establishing module, a contract compiler, a smart contract container, a main chain ledger, etc., which are not specifically limited here.

S701. A verification rule establishing module 7A in a supervision node creates an atomic verification rule.

In the embodiments of the present specification, the atomic verification rule can refer to a basic rule for data verification. Data verification and supervision can be performed in an actual application scenario with reference to a specific supervision metric.

S703. The verification rule establishing module 7A reads a supervision metric from a main chain ledger 7D.

S705. The verification rule establishing module 7A defines a corresponding atomic verification rule based on the read supervision metric.

S707. Send the defined atomic verification rule to a contract compiler 7B in the supervision node to perform structured processing, to compile the defined atomic verification rule into byte code or machine code of another type.

S709. The contract compiler 7B sends the processed atomic verification rule to a smart contract container 7C.

S711. The supervision node uses the smart contract container 7C to allocate an atomic contract identity to the processed atomic verification rule.

S713. Another blockchain node in a main chain network uploads the allocated atomic contract identity after performing consensus, that is, stores the atomic contract identity in the main chain ledger 7D.

S715. The verification rule establishing module 7A caches the atomic contract identity after consensus in a local database of the supervision node.

S717. The verification rule establishing module 7A creates, based on a supervision metric selected from the local database, an atomic verification rule, and a definition standard, a data verification rule contract corresponding to a supervision task.

S719. The contract compiler 7B precompiles the data verification rule contract, that is, compiles the data verification rule contract into byte code or machine code of another type.

S721. Send the precompiled data verification rule contract to the smart contract container 7C.

S723. The supervision node uses the smart contract container 7C to read the supervision metric and an atomic contract from the main chain ledger 7D.

S725. The supervision node uses the smart contract container 7C to determine whether the read supervision metric and atomic contract exist in the precompiled data verification rule contract.

S727. The main chain network uploads a determining result after performing consensus, that is, stores the determining result in the main chain ledger 7D.

S729. The verification rule establishing module 7A caches the determining result in the local database.

Figure 8:
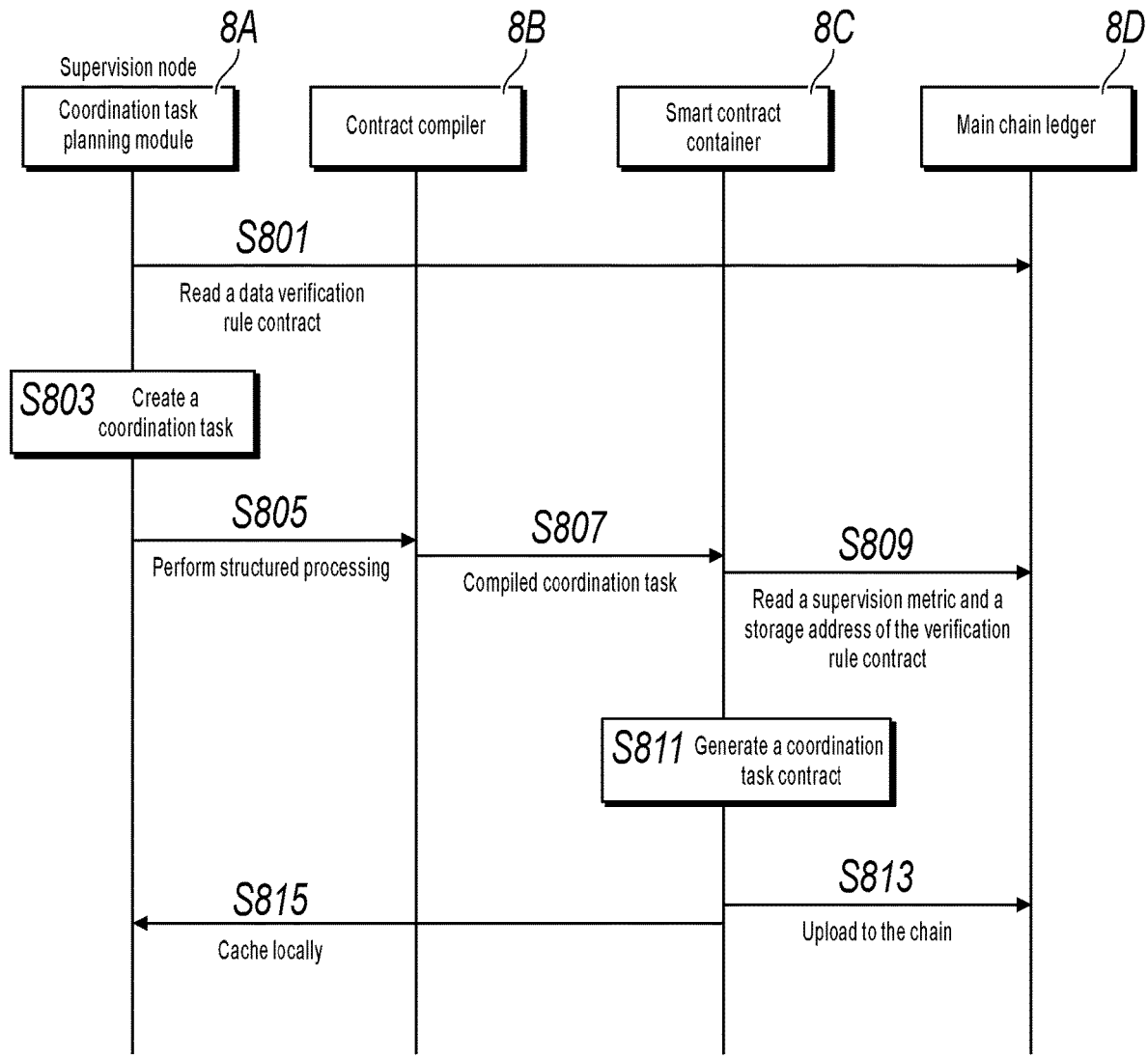
FIG. 8 is a time sequence diagram illustrating creation of a coordination task contract in a data verification method, according to some embodiments of the present specification.

FIG. 8 is a time sequence diagram illustrating planning of a coordination task in a data verification method, according to some embodiments of the present specification. The coordination task can be specifically a verification node allocation policy. In the embodiments of the present specification, the supervision node is configured with a coordination task planning module, a contract compiler, a smart contract container, a main chain ledger, etc., which are not specifically limited here.

S801. A coordination task planning module 8A in a supervision node reads a data verification rule contract from a main chain ledger 8D.

S803. The coordination task planning module 8A creates a coordination task based on the data verification rule contract.

In the embodiments of the present specification, the created coordination task includes a coordinating node corresponding to a specified coordination task, and sets a reserved bit of a third-party verification node of a specified type, and a policy type corresponding to the coordination task.

S805. Send the created coordination task to a contract compiler 8B in the supervision node to perform structured processing, to compile the created coordination task into byte code or machine code of another type.

S807. Send the compiled coordination task to a smart contract container 8C.

S809. The supervision node reads, through the smart contract container 8C, a supervision metric and a storage address of the verification rule contract that are stored in the main chain ledger 8D.

S811. The smart contract container 8C generates a coordination task contract based on the read supervision metric and storage address of the verification rule contract.

S813. Upload the coordination task contract after performing consensus, that is, store the coordination task contract after consensus in the main chain ledger 8D.

S815. The coordination task planning module 8A caches the coordination task contract locally.

Figure 9:
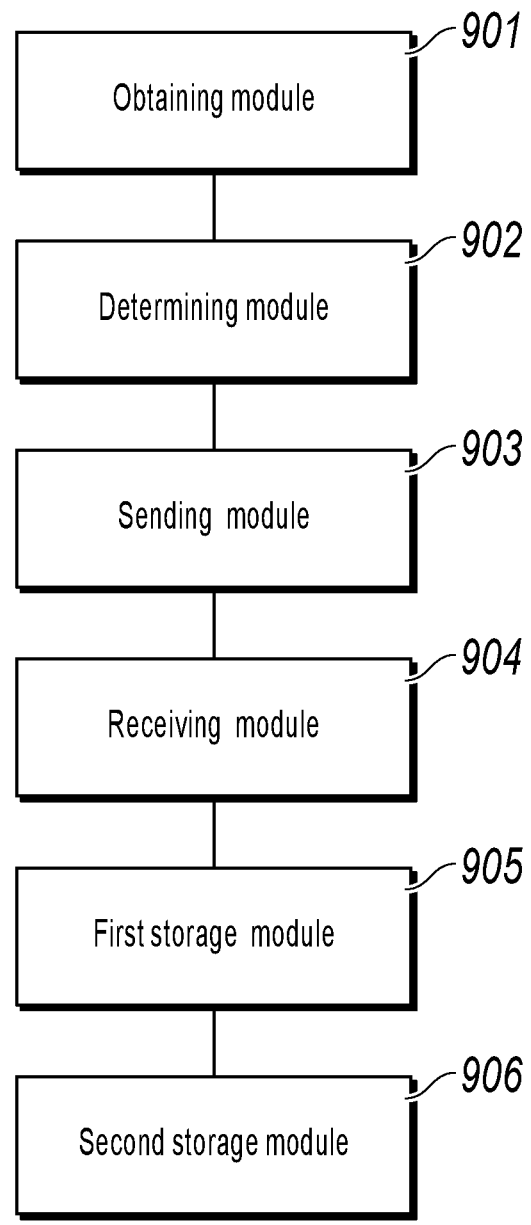
FIG. 9 is a schematic structural diagram illustrating a data verification apparatus, according to some embodiments of the present specification.

Based on the same inventive concept, some embodiments of the present specification further provide a data verification apparatus, applied to a first blockchain node. FIG. 9 is a schematic structural diagram illustrating a data verification apparatus, according to some embodiments of the present specification, including: an obtaining module 901, configured to obtain a smart contract from a main chain network including the first blockchain node; a determining module 902, configured to determine, based on the smart contract, a sub-chain network corresponding to the main chain network and including the first blockchain node and a second blockchain node; a sending module 903, configured to send a data verification request to the second blockchain node through the sub-chain network, where the data verification request includes data to be verified; a receiving module 904, configured to receive, from the second blockchain node, a verification result and verification progress information that pass consensus; a first storage module 905, configured to store the verification result in the sub-chain network; and a second storage module 906, configured to store the verification progress information in the main chain network.

According to the data verification apparatus provided in the embodiments of the present specification, the first blockchain node determines the sub-chain network based on the smart contract obtained from the main chain network, where the sub-chain network includes the first blockchain node and the second blockchain node. As such, the first blockchain node can send the data verification request including the data to be verified to the second blockchain node through the sub-chain network, and the second blockchain node verifies the data to be verified. When the first blockchain node receives the verification result and the verification progress information that pass consensus, the first blockchain node stores the verification result in the sub-chain network, and stores the verification progress information in the main chain network.

As such, the data to be verified that is provided by the first blockchain node is verified in the sub-chain network, and the verification result is stored in the sub-chain network. Therefore, the data to be verified is prevented from spreading to other nodes in the main chain network, and data security and privacy are protected. For the main chain network, because each blockchain node can obtain verification progress information of each sub-chain network, supervision and publicity of data verification progress are implemented.

Figure 10:
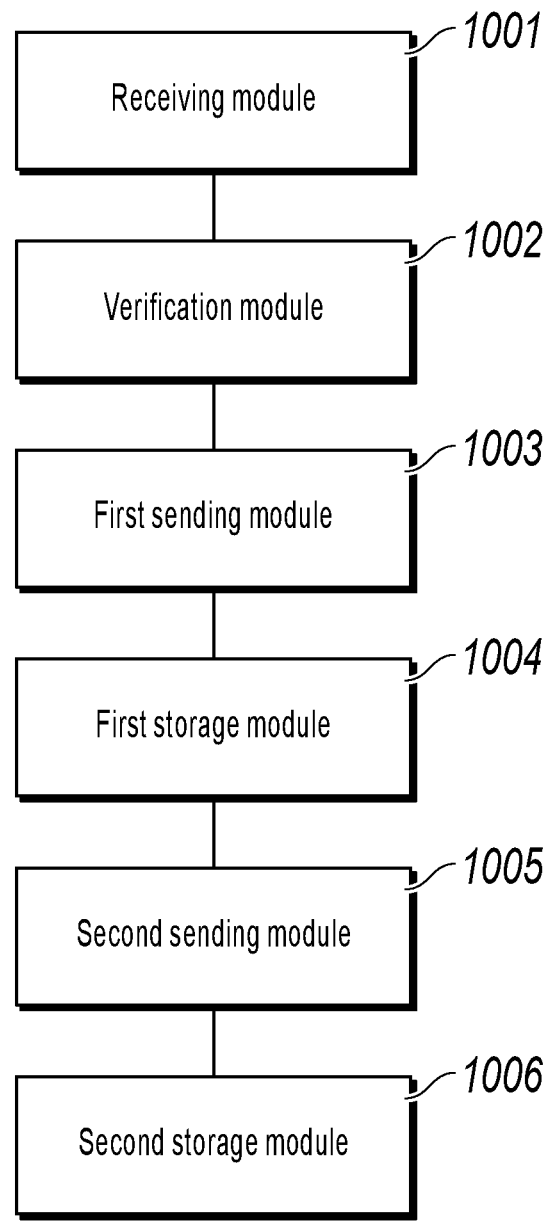
FIG. 10 is a schematic structural diagram illustrating a data verification apparatus, according to some embodiments of the present specification.

Based on the same inventive concept, some embodiments of the present specification further provide a data verification apparatus, applied to a second blockchain node. FIG. 10 is a schematic structural diagram illustrating a data verification apparatus, according to some embodiments of the present specification, including: a receiving module 1001, configured to receive, through a sub-chain network, a data verification request sent by a first blockchain node, where the sub-chain network includes the first blockchain node and the second blockchain node, and the sub-chain network is determined by the first blockchain node based on a smart contract in a main chain network including the first blockchain node; a verification module 1002, configured to verify, based on a predetermined data verification policy, data to be verified that is included in the data verification request, to obtain a verification result and verification progress information; a first sending module 1003, configured to send a first consensus request including the verification result to the sub-chain network; a first storage module 1004, configured to store the verification result in the sub-chain network if the verification result passes consensus; a second sending module 1005, configured to send a second consensus request including the verification progress information to the main chain network; and a second storage module 1006, configured to store the verification progress information in the main chain network if the verification progress information passes consensus.

According to the data verification apparatus provided in the embodiments of the present specification, the first blockchain node determines the sub-chain network based on the smart contract obtained from the main chain network, where the sub-chain network includes the first blockchain node and the second blockchain node. As such, the first blockchain node can send the data verification request including the data to be verified to the second blockchain node through the sub-chain network, and the second blockchain node verifies the data to be verified. When the first blockchain node receives the verification result and the verification progress information that pass consensus, the first blockchain node stores the verification result in the sub-chain network, and stores the verification progress information in the main chain network.

As such, the data to be verified that is provided by the first blockchain node is verified in the sub-chain network, and the verification result is stored in the sub-chain network. Therefore, the data to be verified is prevented from spreading to other nodes in the main chain network, and data security and privacy are protected. For the main chain network, because each blockchain node can obtain verification progress information of each sub-chain network, supervision and publicity of data verification progress are implemented.

Based on the same inventive concept, some embodiments of the present specification further provide an electronic device, including at least one processor and a memory, where the memory stores a program, and the at least one processor is configured to perform the following steps: obtaining a smart contract from a main chain network including a first blockchain node; determining, based on the smart contract, a sub-chain network corresponding to the main chain network and including the first blockchain node and a second blockchain node; sending a data verification request to the second blockchain node through the sub-chain network, where the data verification request includes data to be verified; receiving, from the second blockchain node, a verification result and verification progress information that pass consensus; storing the verification result in the sub-chain network; and storing the verification progress information in the main chain network.

For other functions of the processor, references can be made to content described in the previous embodiments. Details are omitted here for simplicity.

Based on the same inventive concept, some embodiments of the present specification further provide a computer-readable storage medium, including a program used in combination with an electronic device, where the program can be executed by a processor to complete the following steps: obtaining a smart contract from a main chain network including a first blockchain node; determining, based on the smart contract, a sub-chain network corresponding to the main chain network and including the first blockchain node and a second blockchain node; sending a data verification request to the second blockchain node through the sub-chain network, where the data verification request includes data to be verified; receiving, from the second blockchain node, a verification result and verification progress information that pass consensus; storing the verification result in the sub-chain network; and storing the verification progress information in the main chain network.

For other functions of the processor, references can be made to content described in the previous embodiments. Details are omitted here for simplicity.

Based on the same inventive concept, some embodiments of the present specification further provide an electronic device, including at least one processor and a memory, where the memory stores a program, and the at least one processor is configured to perform the following steps: receiving, through a sub-chain network, a data verification request sent by a first blockchain node, where the sub-chain network includes the first blockchain node and a second blockchain node, and the sub-chain network is determined by the first blockchain node based on a smart contract in a main chain network including the first blockchain node; verifying, based on a predetermined data verification policy, data to be verified that is included in the data verification request, to obtain a verification result and verification progress information; sending a first consensus request including the verification result to the sub-chain network; if the verification result passes consensus, storing the verification result in the sub-chain network; sending a second consensus request including the verification progress information to the main chain network; and if the verification progress information passes consensus, storing the verification progress information in the main chain network.

For other functions of the processor, references can be made to content described in the previous embodiments. Details are omitted here for simplicity.

Based on the same inventive concept, some embodiments of the present specification further provide a computer-readable storage medium, including a program used in combination with an electronic device, where the program can be executed by a processor to complete the following steps: receiving, through a sub-chain network, a data verification request sent by a first blockchain node, where the sub-chain network includes the first blockchain node and a second blockchain node, and the sub-chain network is determined by the first blockchain node based on a smart contract in a main chain network including the first blockchain node; verifying, based on a predetermined data verification policy, data to be verified that is included in the data verification request, to obtain a verification result and verification progress information; sending a first consensus request including the verification result to the sub-chain network; if the verification result passes consensus, storing the verification result in the sub-chain network; sending a second consensus request including the verification progress information to the main chain network; and if the verification progress information passes consensus, storing the verification progress information in the main chain network.

For other functions of the processor, references can be made to content described in the previous embodiments. Details are omitted here for simplicity.

In the 1990s, whether a technical improvement is a hardware improvement (for example, an improvement to a circuit structure, such as a diode, a transistor, or a switch) or a software improvement (for example, an improvement to a method procedure) can be clearly distinguished. However, as technologies develop, a current improvement for many method procedures can be considered as a direct improvement of a hardware circuit structure. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming autonomously to "integrate" a digital system into a PLD. There is no need to ask a chip manufacturer to design and manufacture a dedicated integrated circuit chip. Moreover, nowadays, manual manufacturing of integrated circuit chips is being replaced. Such programming is also mostly implemented by using "logic compiler (logic compiler)" software instead. The software is similar to a software compiler used to develop and compile a program. However, before compilation, original code also needs to be compiled in a particular programming language. The language is referred to as a hardware description language (HDL). There are many HDLs, such as the Advanced Boolean Expression Language (ABEL), the Altera hardware description language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The Very-High-Speed Integrated Circuit Hardware Description Language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be in the form of a microprocessor or a processor, or a computer-readable medium that stores computer-readable program code (such as software or firmware) that can be executed by the microprocessor or the processor, a logic gate, a switch, an application specific integrated circuit (ASIC), a programmable logic controller, or an embedded microprocessor. Examples of the controller include but are not limited to the following microprocessors: ARC 625D, Atmel AT91SAM, Microchip PIC18F26K20, and Silicone Labs C8051F320. A memory controller can also be implemented as a part of the control logic of the memory. A person skilled in the art also knows that, in addition to implementing the controller by using the computer-readable program code, logic programming can be performed on method steps to allow the controller to implement the same function in forms of the logic gate, the switch, the ASIC, the programmable logic controller, and the embedded microprocessor. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit described in the previous embodiments can be implemented by a computer chip or an entity, or implemented by a product having a certain function. A typical implementation device is a computer. Specifically, the computer can be, for example, a personal computer, a laptop computer, a cellular phone, a camera phone, a smartphone, a personal digital assistant, a media player, a navigation device, an email receiving and sending device, a game console, a tablet computer, a wearable device, or any combination of these devices.

For ease of description, the apparatus above is described by dividing functions into various units. Certainly, when the present application is implemented, a function of each unit can be implemented in one or more pieces of software and/or hardware.

A person skilled in the art should understand that an embodiment of the present invention can be provided as a method, a system, or a computer program product. Therefore, the present invention can use a form of hardware only embodiments, software only embodiments, or embodiments with a combination of software and hardware. Moreover, the present invention can use a form of a computer program product that is implemented on one or more computer-usable storage media (including but not limited to a disk memory, a CD-ROM, an optical memory, etc.) that include computer-usable program code.

The present specification is described with reference to the flowcharts and/or block diagrams of the method, the device (system), and the computer program product based on the embodiments of the present specification. It should be understood that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more processes in the flowcharts and/or in one or more blocks in the block diagrams.

These computer program instructions can be stored in a computer-readable memory that can instruct the computer or the another programmable data processing device to work in a specific way, so that the instructions stored in the computer-readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory may include a non-persistent memory, a random access memory (RAM), a non-volatile memory, and/or another form in a computer-readable medium, for example, a read-only memory (ROM) or a flash memory (flash RAM). The memory is an example of the computer-readable medium.

The computer-readable medium includes persistent, non-persistent, removable, and non-removable media that can store information by using any method or technology. The information can be a computer-readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer-readable medium does not include transitory media such as a modulated data signal and carrier.

It is also worthwhile to note that the terms "include", "contain", or their any other variants are intended to cover a non-exclusive inclusion, so that a process, a method, a product, or a device that includes a list of elements not only includes those elements but also includes other elements not expressly listed, or further includes elements inherent to such process, method, product, or device. Without more constraints, an element preceded by "includes a" does not preclude the existence of additional identical elements in the process, method, product or device that includes the element.

The present application can be described in the general context of computer-executable instructions, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In the distributed computing environment, the program module can be located in both local and remote computer storage media including storage devices.

The embodiments in the present specification are described in a progressive way. For same or similar parts of the embodiments, mutual references can be made. Each embodiment focuses on a difference from other embodiments. Particularly, a system embodiment is similar to a method embodiment, and therefore is described briefly. For related parts, references can be made to related descriptions in the method embodiment.

The previous descriptions are merely embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented method, comprising:
obtaining, by a first blockchain node, a smart contract from a main chain network comprising the first blockchain node;
determining, based on the smart contract, a sub-chain network corresponding to the main chain network and comprising the first blockchain node and a second blockchain node, wherein determining the sub-chain network comprises, in response to determining that a historical sub-chain network has been previously constructed based on the first blockchain node and is stored in the main chain network, determining the sub-chain network based on the historical sub-chain network;

sending, by the first blockchain node and to the second blockchain node, through the sub-chain network, a data verification request that comprises data to be verified;
receiving, by the first blockchain node and from the second blockchain node, a verification result and verification progress information;
storing the verification result in the sub-chain network; and
storing the verification progress information in the main chain network.

2. The computer-implemented method of claim 1, further comprising:
sending, by the first blockchain node, a sub-chain network construction request to the main chain network; and
after the sub-chain network has been constructed, receiving, by the first blockchain node, identity information of the sub-chain network.

3. The computer-implemented method of claim 2, further comprising:
before sending the sub-chain network construction request to the main chain network, obtaining identity information of at least one second blockchain node in the main chain network based on the smart contract; and
generating, by the first blockchain node, the sub-chain network construction request based on the identity information of the second blockchain node.

4. The computer-implemented method of claim 3, wherein obtaining identity information of at least one second blockchain node in the main chain network comprises:
determining a service type corresponding to the data to be verified; and
obtaining, based on the smart contract, the identity information of the second blockchain node corresponding to the service type in the main chain network.

5. The computer-implemented method of claim 2, further comprising:
configuring a sub-chain ledger corresponding to the identity information of the sub-chain network.

6. The computer-implemented method of claim 1, wherein determining the sub-chain network based on the historical sub-chain network comprises:
in response to determining that the smart contract comprises update information of identity information of the second blockchain node in the historical sub-chain network, determining the sub-chain network based on the update information.

7. A non-transitory, computer-readable medium storing one or more instructions executable by a computer system to perform operations comprising:
obtaining, by a first blockchain node, a smart contract from a main chain network comprising the first blockchain node;
determining, based on the smart contract, a sub-chain network corresponding to the main chain network and comprising the first blockchain node and a second blockchain node, wherein determining the sub-chain network comprises, in response to determining that a historical sub-chain network has been previously constructed based on the first blockchain node and is stored in the main chain network, determining the sub-chain network based on the historical sub-chain network;
sending, by the first blockchain node and to the second blockchain node, through the sub-chain network, a data verification request that comprises data to be verified;
receiving, by the first blockchain node and from the second blockchain node, a verification result and verification progress information;
storing the verification result in the sub-chain network; and
storing the verification progress information in the main chain network.

8. The computer-readable medium of claim 7, the operations further comprising:
sending, by the first blockchain node, a sub-chain network construction request to the main chain network; and
after the sub-chain network has been constructed, receiving, by the first blockchain node, identity information of the sub-chain network.

9. The computer-readable medium of claim 8, the operations further comprising:
before sending the sub-chain network construction request to the main chain network, obtaining identity information of at least one second blockchain node in the main chain network based on the smart contract; and
generating, by the first blockchain node, the sub-chain network construction request based on the identity information of the second blockchain node.

10. The computer-readable medium of claim 9, wherein obtaining identity information of at least one second blockchain node in the main chain network comprises:
determining a service type corresponding to the data to be verified; and
obtaining, based on the smart contract, the identity information of the second blockchain node corresponding to the service type in the main chain network.

11. The computer-readable medium of claim 8, the operations further comprising:
configuring a sub-chain ledger corresponding to the identity information of the sub-chain network.

12. The computer-readable medium of claim 7, wherein determining the sub-chain network based on the historical sub-chain network comprises:
in response to determining that the smart contract comprises update information of identity information of the second blockchain node in the historical sub-chain network, determining the sub-chain network based on the update information.

13. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining, by a first blockchain node, a smart contract from a main chain network comprising the first blockchain node;
determining, based on the smart contract, a sub-chain network corresponding to the main chain network and comprising the first blockchain node and a second blockchain node, wherein determining the sub-chain network comprises, in response to determining that a historical sub-chain network has been previously constructed based on the first blockchain node and is stored in the main chain network, determining the sub-chain network based on the historical sub-chain network;

sending, by the first blockchain node and to the second blockchain node, through the sub-chain network, a data verification request that comprises data to be verified;

receiving, by the first blockchain node and from the second blockchain node, a verification result and verification progress information;

storing the verification result in the sub-chain network; and storing the verification progress information in the main chain network.

14. The computer-implemented system of claim 13, the operations further comprising:

sending, by the first blockchain node, a sub-chain network construction request to the main chain network; and after the sub-chain network has been constructed, receiving, by the first blockchain node, identity information of the sub-chain network.

15. The computer-implemented system of claim 14, the operations further comprising:

before sending the sub-chain network construction request to the main chain network, obtaining identity information of at least one second blockchain node in the main chain network based on the smart contract; and generating, by the first blockchain node, the sub-chain network construction request based on the identity information of the second blockchain node.

16. The computer-implemented system of claim 15, wherein obtaining identity information of at least one second blockchain node in the main chain network comprises:

determining a service type corresponding to the data to be verified; and obtaining, based on the smart contract, the identity information of the second blockchain node corresponding to the service type in the main chain network.

17. The computer-implemented system of claim 14, the operations further comprising:

configuring a sub-chain ledger corresponding to the identity information of the sub-chain network.

18. The computer-implemented system of claim 13, wherein determining the sub-chain network based on the historical sub-chain network comprises:

in response to determining that the smart contract comprises update information of identity information of the second blockchain node in the historical sub-chain network, determining the sub-chain network based on the update information.

\* \* \* \* \*